United States Patent
Takeshita et al.

(10) Patent No.: US 10,447,419 B2
(45) Date of Patent: Oct. 15, 2019

(54) OPTICAL NODE DEVICE, OPTICAL NETWORK CONTROLLER, AND OPTICAL NETWORK CONTROL METHOD

(71) Applicant: NEC Corporation, Minato-ku, Tokyo (JP)

(72) Inventors: Hitoshi Takeshita, Tokyo (JP); Shinsuke Fujisawa, Tokyo (JP); Tomoyuki Hino, Tokyo (JP); Akio Tajima, Tokyo (JP)

(73) Assignee: NEC CORPORATION, Tokyo (JP)

( * ) Notice: Subject to any disclaimer, the term of this patent is extended or adjusted under 35 U.S.C. 154(b) by 121 days.

(21) Appl. No.: 15/304,912

(22) PCT Filed: Apr. 15, 2015

(86) PCT No.: PCT/JP2015/002074
§ 371 (c)(1),
(2) Date: Oct. 18, 2016

(87) PCT Pub. No.: WO2015/162874
PCT Pub. Date: Oct. 29, 2015

(65) Prior Publication Data
US 2017/0180073 A1 Jun. 22, 2017

(30) Foreign Application Priority Data
Apr. 24, 2014 (JP) .................................. 2014-089695

(51) Int. Cl.
*H04J 14/02* (2006.01)
*H04B 10/27* (2013.01)

(52) U.S. Cl.
CPC .............. *H04J 14/02* (2013.01); *H04B 10/27* (2013.01); *H04J 14/026* (2013.01); *H04J 14/0224* (2013.01)

(58) Field of Classification Search
CPC ...... H04B 10/27; H04J 14/02; H04J 14/0224; H04J 14/026
(Continued)

(56) References Cited

U.S. PATENT DOCUMENTS 8,818,191 B2 * 8/2014 Sakamoto ........... H04J 14/0204
398/173
9,083,485 B2 7/2015 Wang et al.
(Continued)

FOREIGN PATENT DOCUMENTS

JP H06-252867 A 9/1994
JP 2008-227556 A 9/2008
(Continued)

OTHER PUBLICATIONS

Jinno et al; Spectrum-Efficient and Scalable Elastic optical path network: Architecture, Benefits, and Enabling Technologies; Nov. 2009; IEEE; pp. 66-73.*
(Continued)

*Primary Examiner* — Amritbir K Sandhu

(57) ABSTRACT

In an optical network based on a dense wavelength division multiplexing system using a flexible frequency grid, it is difficult to improve the usage efficiency of an optical frequency band owing to the occurrence of fragmentation of the optical frequency band; therefore, an optical network controller according to an exemplary aspect of the present invention includes an optical frequency region setting means for dividing an optical frequency band used in an optical network based on a dense wavelength division multiplexing system using a flexible frequency grid, and setting a plurality of optical frequency regions; and an optical path setting means for setting optical paths having a common attribute in at least one of the plurality of optical frequency regions.

18 Claims, 16 Drawing Sheets

(58) Field of Classification Search
USPC .......................................... 398/43, 79, 82, 89
See application file for complete search history.

(56) References Cited

U.S. PATENT DOCUMENTS

| | | | | |
|---|---|---|---|---|
| 9,621,272 | B2* | 4/2017 | Tajima | .................. H04B 10/40 |
| 9,654,247 | B2* | 5/2017 | Patel | ................... H04J 14/0256 |
| 9,979,468 | B2* | 5/2018 | Fujisawa | .............. H04B 10/032 |
| 2012/0301141 | A1 | 11/2012 | Sakamoto et al. | |
| 2013/0272710 | A1 | 10/2013 | Wang et al. | |
| 2014/0328587 | A1* | 11/2014 | Magri | ..................... H04L 45/62 |
| | | | | 398/26 |
| 2016/0212511 | A1* | 7/2016 | Takeshita | ................ H04J 14/02 |
| 2016/0352452 | A1* | 12/2016 | Takeshita | ............ H04J 14/0263 |
| 2017/0054506 | A1* | 2/2017 | Takeshita | ............... H04B 10/27 |
| 2017/0180073 | A1* | 6/2017 | Takeshita | ............... H04B 10/27 |
| 2017/0302370 | A1* | 10/2017 | Fujisawa | ............. H04B 10/032 |
| 2017/0338890 | A1* | 11/2017 | Takeshita | ............... H04B 10/27 |
| 2017/0353244 | A1* | 12/2017 | Takeshita | .............. H04L 12/437 |

FOREIGN PATENT DOCUMENTS

| | | | |
|---|---|---|---|
| JP | 2012-029156 | A | 2/2012 |
| JP | 2012029156 | A  * | 2/2012 |
| JP | 2012-248958 | A | 12/2012 |
| JP | 2013-223245 | A | 10/2013 |
| JP | 2014-017651 | A | 1/2014 |

OTHER PUBLICATIONS

Masahiko Jinno et al. "Spectrum-Efficient and Scalable Elastic Optical Path Network: Architecture, Benefits, and Enabling Technologies", IEEE Communication Magazine, Nov. 2009, vol. 47, No. 11, pp. 66-73.

International Search Report for PCT Application No. PCT/JP2015/002074, dated Jun. 2, 2015.

English translation of Written opinion for PCT Application No. PCT/JP2015/002074.

* cited by examiner

FIG. 5

|  | SLOT WIDTH | INITIALLY ALLOCATED NUMBER | MAXIMUM NUMBER OF ADDABLE ALLOCATION |
|---|---|---|---|
| BAND 1 | 1 | 8 | 4 |
| BAND 2 | 2 | 5 | 2 |
| BAND 3 | 4 | 2 | 1 |

FIG. 7

|  | SLOT WIDTH | INITIALLY ALLOCATED NUMBER | MAXIMUM NUMBER OF ADDABLE ALLOCATION |
|---|---|---|---|
| BAND 1 | 1 | 8 | 14 |
| BAND 2 | 2 | 5 | 2 |
| BAND 3 | 4 | 2 | 0 |

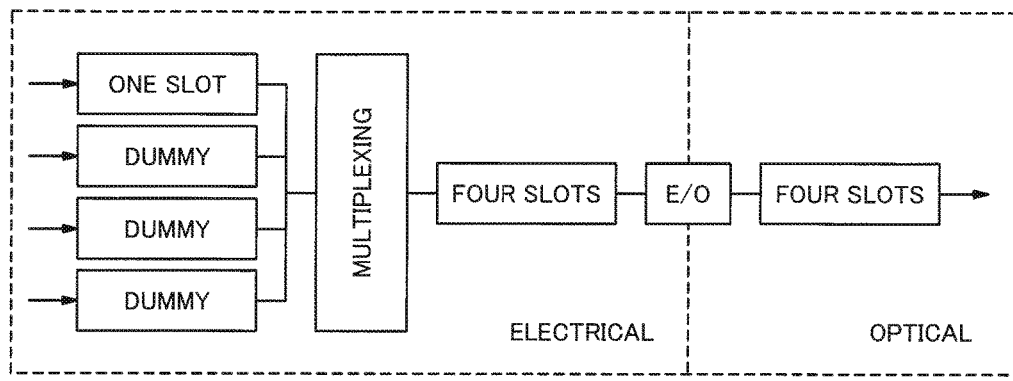

| SLOT WIDTH | INITIALLY ALLOCATED NUMBER | MAXIMUM NUMBER OF ADDABLE ALLOCATION | | |
|---|---|---|---|---|
| | | COMPARATIVE EXAMPLE | FIRST EXEMPLARY EMBODIMENT (OPTICAL MULTIPLEXING) | SECOND EXEMPLARY EMBODIMENT (OPTICAL+ELECTRICAL MULTIPLEXING) |
| 1 | 8 | 14 | 4 | 12 |
| 2 | 5 | 2 | 2 | 4 |
| 4 | 2 | 0 | 1 | 1 |

OPTICAL NODE DEVICE, OPTICAL NETWORK CONTROLLER, AND OPTICAL NETWORK CONTROL METHOD

This application is a National Stage Entry of PCT/JP2015/002074 filed on Apr. 15, 2015, which claims priority from Japanese Patent Application 2014-089695 filed on Apr. 24, 2014, the contents of all of which are incorporated herein by reference, in their entirety.

TECHNICAL FIELD

The present invention relates to optical node devices, optical network controllers, and optical network control methods, in particular, to an optical node device, an optical network controller, and an optical network control method that are used in an optical network based on a dense wavelength division multiplexing system using a flexible frequency grid.

BACKGROUND ART

A current challenge for optical communications is to expand the capacities of optical backbone network to cope with the possible future explosive expansion of information communications traffic. Various approaches are being taken to the challenge. One of the approaches is to carry out research and development regarding an improvement in usage efficiency of an optical frequency band.

In optical networks, optical frequency bands are used in accordance with the Dense Wavelength Division Multiplexing (DWDM) system standardized by the Telecommunication Standardization sector of the International Telecommunication Union (ITU-T). In the DWDM system, the entire available optical frequency band is divided into narrow segments by a grid with constant width, called a wavelength grid, and optical signals in one wavelength channel are allocated within a grid spacing (ITU-T recommendation G.694.1).

In a flexible frequency grid that is standardized by ITU-T recommendation G.694.1, the minimum channel spacing is set at 12.5 GHz instead of 50 GHz used conventionally, and a frequency slot width is variable by 12.5 GHz. This makes it possible to allocate a frequency slot of different widths to each optical path; accordingly, it becomes possible to minimize an optical bandwidth to be allocated to an optical path.

That is to say, the flexible frequency grid enables to allocate an optical bandwidth only as needed. Specifically, for example, it is only necessary in the flexible frequency grid to allocate an optical bandwidth of 12.5 GHz if the required optical bandwidth is equal to 12.5 GHz and to allocate an optical bandwidth of 50 GHz if it is equal to 50 GHz. In contrast, in a fixed grid before the introduction of the flexible frequency grid, if the frequency slot width is set at 50 GHz, an optical bandwidth of 50 GHz is allocated equally to each optical path regardless of a required optical bandwidth. Even though a required optical bandwidth is 12.5 GHz, for example, the optical bandwidth to be allocated is 50 GHz; accordingly, a bandwidth by 37.5 GHz is allocated in vain. In contrast, the flexible frequency grid makes it possible to reduce such unnecessary allocation of the bandwidth, so it enables the optical frequency band usage efficiency to improve.

However, even though the flexible frequency grid is used, an unused frequency region can arise, and a fragmentation of the optical bandwidth allocation may arise. It is considered that an optical path with four slots in width is intended to be generated and there are ten empty slots as a whole in the optical frequency band of an optical fiber, for example. If the ten empty slots are composed of five pairs of empty slots each of which includes two consecutive slots, it is impossible to generate an optical path with four slots in width. That is to say, despite the fact that there are sufficient empty slots in total, it is impossible to secure consecutive empty slots because the respective empty slots are disposed in fragments. As a result, the situation may occur where it is impossible to allocate to an optical path a wide optical bandwidth with which high-capacity or long-distance communications can be achieved. This is called a fragmentation of an optical frequency, which is made easier to arise as the center optical frequency of the optical path or the number of slots of the optical bandwidth is changed more repeatedly.

Patent Literature 1 discloses a technology to solve the above-mentioned problem that the fragmentation of the optical frequency arises.

In a method for eliminating the fragmentation of an optical spectrum in an optical network described in Patent Literature 1, first, optical signals are allocated to a plurality of frequency slots. This allocation is performed based on a first-fit algorithm of searching first unoccupied consecutive frequency slots closest to a selected frequency slot. In this case, a frequency slot dependency map is created based on the allocation of a plurality of optical signals to a plurality of frequency slots. The frequency slot dependency map relates groups including one or more frequency slots allocated to different optical signals interdependently.

If an optical signal departure event that an optical signal is dropped from an optical network occurs, a frequency slot occupied by the optical signal is released as a result. The optical signal departure event and the release of frequency slots cause fragmentation of the optical spectrum of the optical network.

In the method for eliminating fragmentation of optical spectrum described in Patent Literature 1, the fragmentation of the optical spectrum is eliminated by reallocating optical signals to different frequency slots based on the frequency slot dependency map. That is to say, by using the frequency slot dependency map after an optical signal departure event, frequency slots of one or more optical signals depending on a frequency slot of a dropped optical signal are determined. Based on that information, an optical signal is reallocated to a frequency slot released by the departure of the dropped optical signal (defragmentation).

There are related technologies described in Patent Literature 2 and Patent Literature 3.

CITATION LIST

Patent Literature

[PTL 1] Japanese Patent Application Laid-open Publication No. 2013-223245 (paragraphs [0021] to [0048])
[PTL 2] Japanese Patent Application Laid-open Publication No. H06-252867
[PTL 3] Japanese Patent Application Laid-open Publication No. 2008-227556

SUMMARY OF INVENTION

Technical Problem

In the above-mentioned method for eliminating fragmentation of optical spectrum described in Patent Literature 1, the fragmentation of the optical spectrum is eliminated by reallocating optical signals to different frequency slots based on the frequency slot dependency map (defragmentation). However, it is difficult to perform the defragmentation of the optical frequency band with all the optical signals uninterrupted instantaneously. The reason is as follows.

It is necessary to change an optical frequency of an optical signal in an optical transmitter and receiver in order to perform the defragmentation of an optical frequency band. However, it takes a time from several seconds to several tens of seconds in the present circumstances to change the optical frequency, to stabilize the optical frequency, and to enable the optical transmitter and receiver to launch its service.

If the defragmentation of the optical frequency band is performed, therefore, communication services are suspended in the intervening period. Since the interruption in communication services takes away from user's convenience remarkably, it is difficult to perform the defragmentation of the optical frequency band with the interruption of communication services during operations of the communication services. As a result, it is impossible to resolve the fragmentation of the optical frequency band; therefore, it is difficult to improve the usage efficiency of the optical frequency band.

As mentioned above, there has been a problem that, in an optical network based on a dense wavelength division multiplexing system using a flexible frequency grid, it is difficult to improve the usage efficiency of an optical frequency band owing to the occurrence of fragmentation of the optical frequency band.

The object of the present invention is to provide an optical node device, an optical network controller, and an optical network control method to solve the problem mentioned above.

Solution to Problem

An optical network controller according to an exemplary aspect of the present invention includes an optical frequency region setting means for dividing an optical frequency band used in an optical network based on a dense wavelength division multiplexing system using a flexible frequency grid, and setting a plurality of optical frequency regions; and an optical path setting means for setting optical paths having a common attribute in at least one of the plurality of optical frequency regions.

An optical node device according to an exemplary aspect of the present invention includes an optical transmitting and receiving means for transmitting and receiving an optical signal propagating through an optical network based on a dense wavelength division multiplexing system using a flexible frequency grid; and a control means for setting a center frequency and a bandwidth of the optical signal in the optical transmitting and receiving means so as to accommodate the optical signal in a specific optical path, wherein the control means selects the specific optical path from among optical paths having a common attribute that are set in at least one of a plurality of optical frequency regions obtained by dividing an optical frequency band used in the optical network.

An optical network system according to an exemplary aspect of the present invention includes an optical node device configured to be used for an optical network based on a dense wavelength division multiplexing system using a flexible frequency grid; and an optical network controller, wherein the optical network controller includes an optical frequency region setting means for dividing an optical frequency band used in the optical network and setting a plurality of optical frequency regions, and an optical path setting means for setting optical paths having a common attribute in at least one of the plurality of optical frequency regions, the optical node device includes an optical transmitting and receiving means for transmitting and receiving an optical signal propagating through the optical network, and a control means for setting a center frequency and a bandwidth of the optical signal in the optical transmitting and receiving means so as to accommodate the optical signal in a specific optical path, wherein the control means selects the specific optical path from among optical paths having a common attribute that are set in at least one of the plurality of optical frequency regions obtained by dividing the optical frequency band used in the optical network.

An optical network control method according to an exemplary aspect of the present invention includes dividing an optical frequency band used in an optical network based on a dense wavelength division multiplexing system using a flexible frequency grid, and setting a plurality of optical frequency regions; and setting optical paths having a common attribute in at least one of the plurality of optical frequency regions.

Advantageous Effects of Invention

According to the optical node device, the optical network controller, and the optical network control method of the present invention, it is possible to prevent the occurrence of fragmentation of an optical frequency band and improve the usage efficiency of the optical frequency band in an optical network based on a dense wavelength division multiplexing system using a flexible frequency grid.

BRIEF DESCRIPTION OF DRAWINGS

FIG. 5 is a diagram illustrating together the numbers of optical paths that can be set in optical frequency regions by the optical network controller in accordance with the first exemplary embodiment of the present invention.

FIG. 7 is a diagram illustrating together the numbers of optical paths that can be set in the comparative example with respect to the exemplary embodiments of the present invention.

FIG. 9 is a schematic diagram for describing another operation of the optical path setting means included in the optical network controller in accordance with the second exemplary embodiment of the present invention.

FIG. 10 is a diagram illustrating together the numbers of optical paths that can be set in optical frequency regions by the optical network controller in accordance with the second exemplary embodiment of the present invention.

DESCRIPTION OF EMBODIMENTS

Exemplary embodiments of the present invention will be described below with reference to the drawings.

A First Exemplary Embodiment

Figure 1:
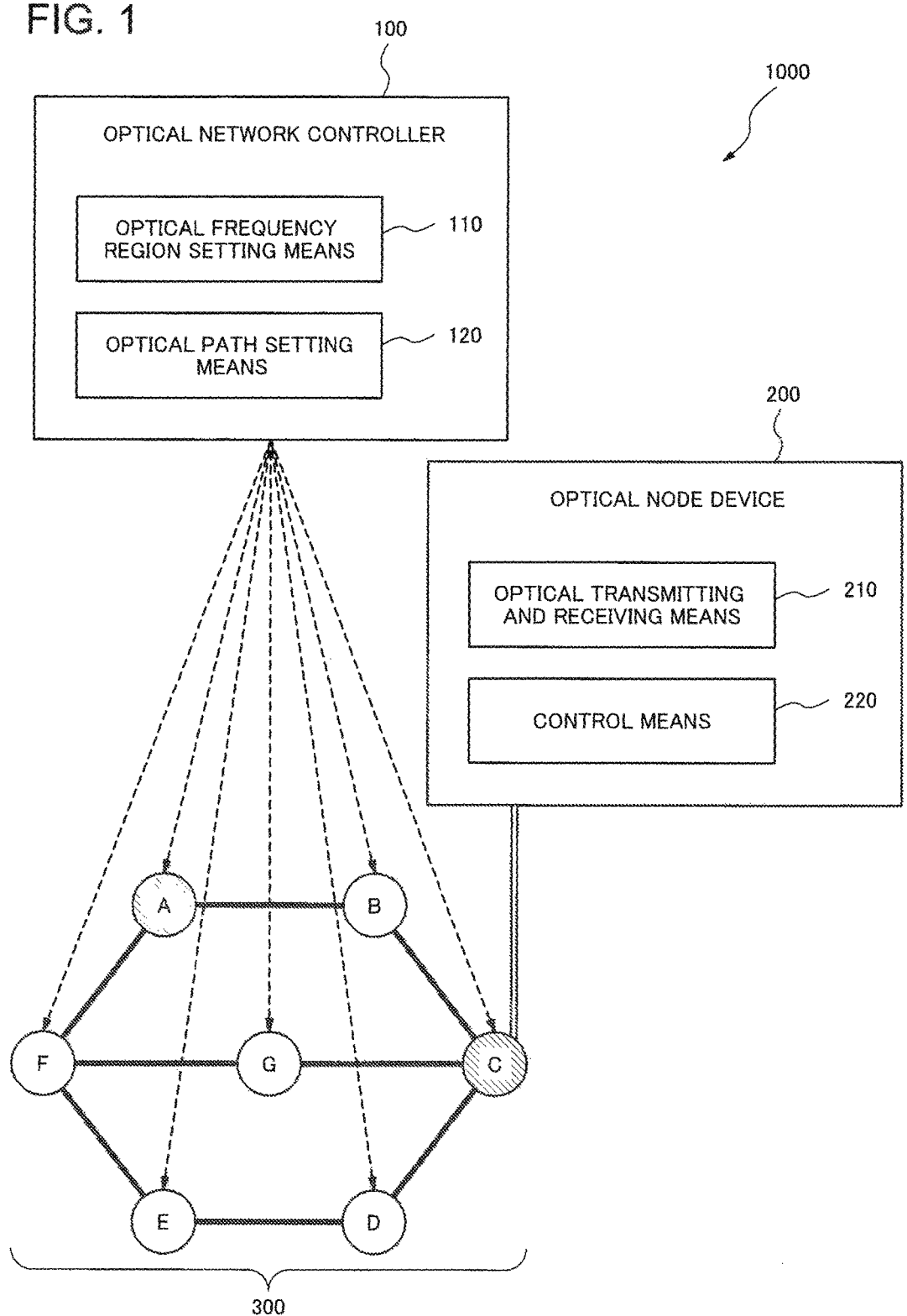
FIG. 1 is a block diagram illustrating a configuration of an optical network system in accordance with a first exemplary embodiment of the present invention.

FIG. 1 is a block diagram illustrating a configuration of an optical network system 1000 in accordance with a first exemplary embodiment of the present invention.

The optical network system 1000 includes an optical network controller 100 and an optical node device 200 that are used for an optical network 300 based on a dense wavelength division multiplexing system using a flexible frequency grid.

The optical network controller 100 includes an optical frequency region setting means 110 and an optical path setting means 120. The optical frequency region setting means 110 divides an optical frequency band used in the optical network 300 and sets a plurality of optical frequency regions. The optical path setting means 120 sets optical paths having a common attribute in at least one of the plurality of optical frequency regions.

The optical node device 200 includes an optical transmitting and receiving means 210 and a control means 220. The optical transmitting and receiving means 210 transmits and receives an optical signal propagating through an optical network. The control means 220 sets a center frequency and a bandwidth of an optical signal in the optical transmitting and receiving means 210 so that the optical signal may be accommodated in a specific optical path. Here, the control means 220 selects the specific optical path from among optical paths having a common attribute that are set in at least one of a plurality of optical frequency regions obtained by dividing an optical frequency band used in the optical network 300.

In the optical network system 1000 according to the present exemplary embodiment, the optical network controller 100 is configured to divide an optical frequency band in advance, set a plurality of optical frequency regions, and set optical paths having a common attribute in at least one of the plurality of optical frequency regions. An optical network control method according to the present exemplary embodiment includes, first, dividing an optical frequency band used in an optical network based on a dense wavelength division multiplexing system using a flexible frequency grid, and setting a plurality of optical frequency regions. And it is configured to set optical paths having a common attribute in at least one of the plurality of optical frequency regions.

Those configurations make it possible to prevent the occurrence of fragmentation of an optical frequency band and improve the usage efficiency of the optical frequency band in an optical network.

The optical path setting means 120 can be configured to set each optical path having an attribute different from one another in each of a plurality of optical frequency regions.

Next, the operation of the optical network controller 100 according to the present exemplary embodiment will be described in further detail.

A case will be described below as an example in which the optical path setting means 120 sets optical paths using the number of frequency slots composing an optical path as an attribute. Specifically, as to types of optical paths, an optical path with one slot in width, an optical path with two slots in width, and an optical path with four slots in width are set.

In the optical network 300 illustrated in FIG. 1, "A" to "F" represent nodes respectively. The optical node device 200 is disposed in each node, and optical fibers connect respective nodes to each other. Here, the optical network controller 100 is configured to notify each optical node device 200 of optical path setting information.

Figure 2:
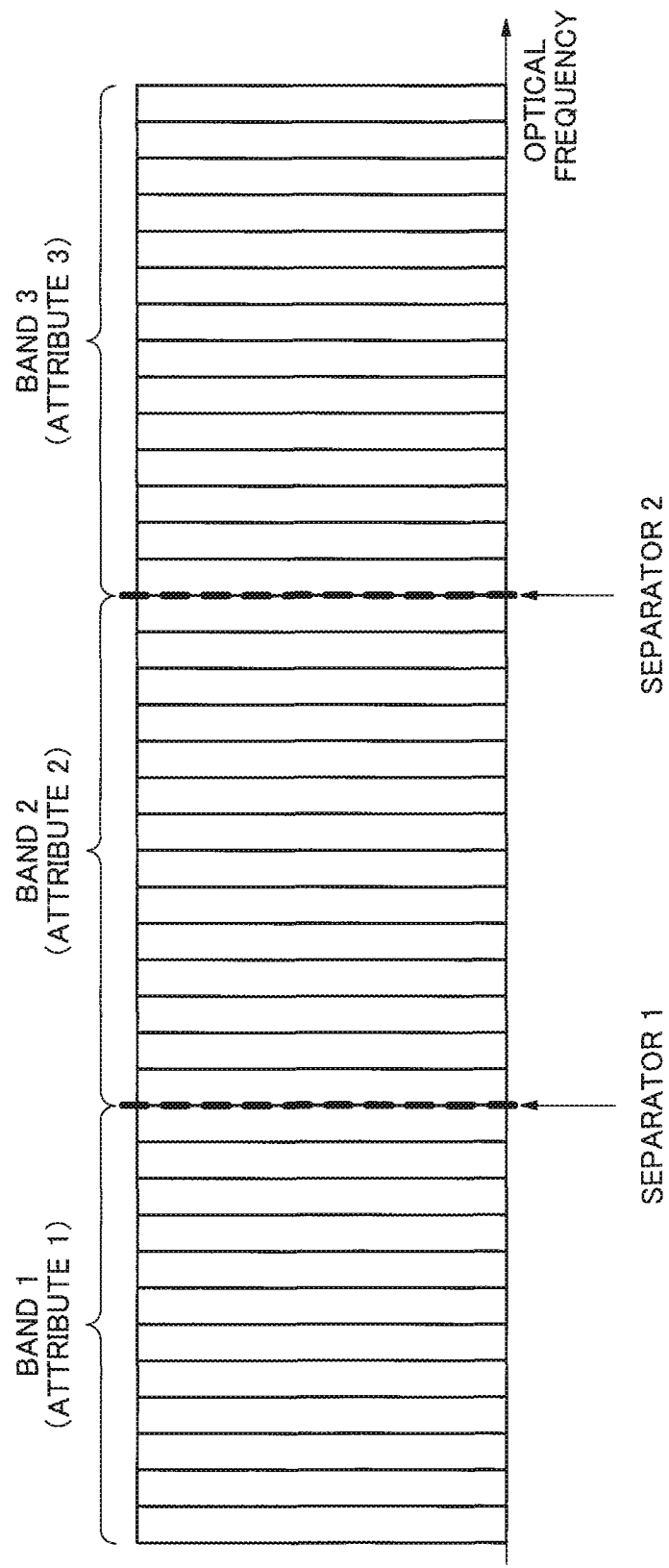
FIG. 2 is a diagram schematically illustrating optical frequency regions to be set by an optical network controller in accordance with the first exemplary embodiment of the present invention.

An optical fiber from the node A to the node C in the optical network 300 will be described as an example. It is assumed that the entirety of the optical frequency region that can be transmitted through the optical fiber complies with a flexible frequency grid standardized by ITU-T recommendation G.694.1, and that the slot width of the flexible frequency grid is forty slots wide in total. FIG. 2 illustrates the entirety of the optical frequency region that can be transmitted through the optical fiber from the node A to the node C. The horizontal axis represents an optical frequency, and each rectangular block represents a frequency slot.

The optical frequency region setting means 110 included in the optical network controller 100 divides the optical frequency band and sets three optical frequency regions (bands 1 to 3), for example. A separator 1 and a separator 2 in FIG. 2 indicate an optical frequency forming the division between the bands. In the example illustrated in FIG. 2, the band 1 is an optical frequency region including twelve slots, the band 2 is one including fourteen slots, and the band 3 is one including fourteen slots.

Figure 3:
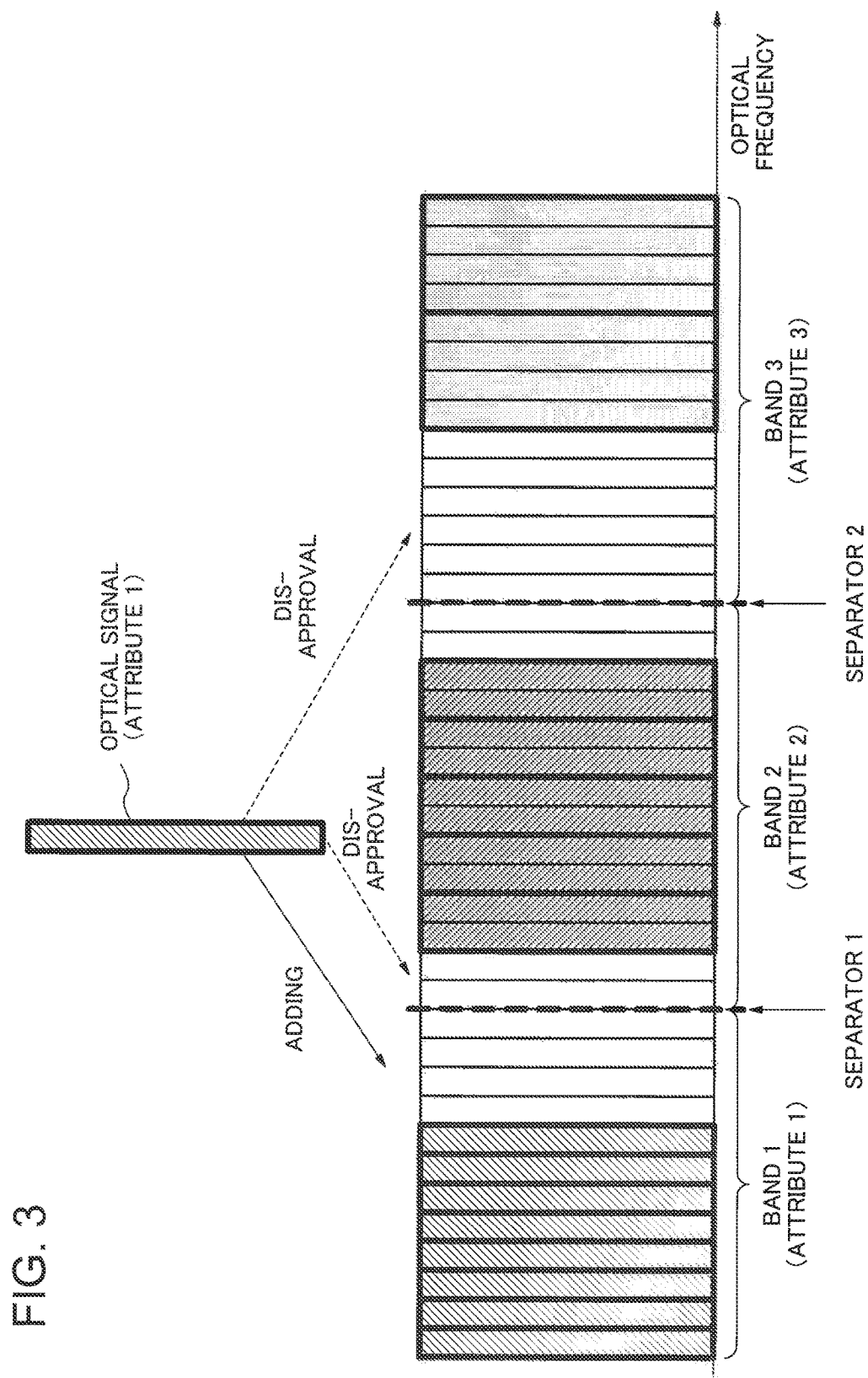
FIG. 3 is a schematic diagram for describing an operation of the optical network controller in accordance with the first exemplary embodiment of the present invention.

Here, the optical path setting means 120 sets optical paths having a common attribute in each of the optical frequency regions (bands), respectively. Accordingly, for example, if it is configured for the band 1 to accommodate only an optical path with one slot in width, the band 1 cannot accommodate an optical path with two slots in width and an optical path with four slots in width that differ in the attribute even though there is an empty area. FIG. 3 schematically illustrates an operation in this case.

Figure 4:
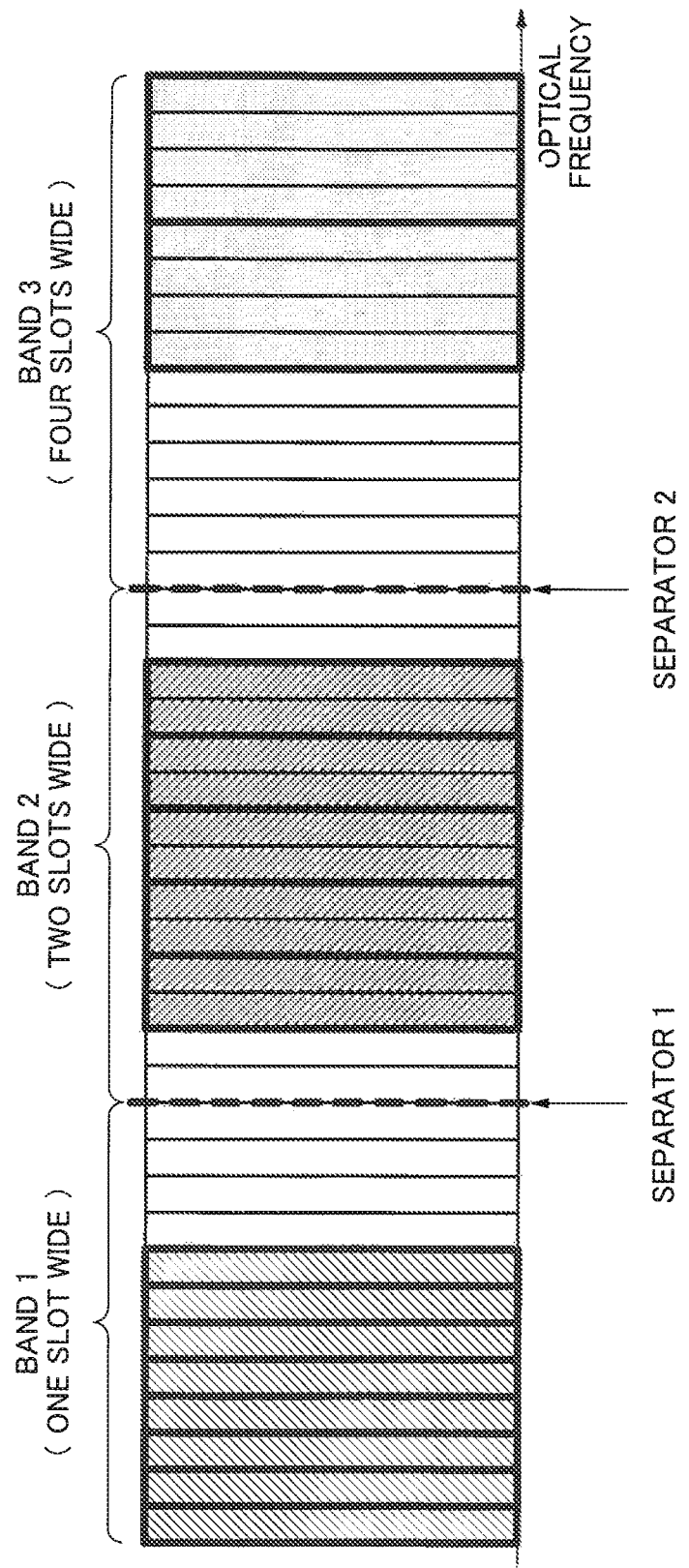
FIG. 4 is a diagram schematically illustrating optical paths to be initially set in optical frequency regions by the optical network controller in accordance with the first exemplary embodiment of the present invention.

As illustrated in FIG. 4, eight pieces of optical path one slot wide, five pieces of optical path two slots wide, and two pieces of optical path four slots wide are set as initial setting in the optical frequency regions illustrated in FIG. 2.

It is considered to set additionally, in the optical frequency regions in the initial state illustrated in FIG. 4, new optical paths to transmit an optical signal through the optical fiber from the node A to the node C in the optical network 300 illustrated in FIG. 1. In this case, if it is possible to set additionally a large number of new optical paths, the number of empty slots, in which no optical path is set, can be decreased, which makes it possible to increase the optical frequency usage efficiency.

In the example illustrated in FIG. 4, the number of empty slots is four in the band 1, four in the band 2, and six in the band 3. In this case, the maximum number of addable optical paths is four in the band 1 for optical path one slot wide, two in the band 2 for optical path two slots wide, and one in the band 3 for optical path four slots wide. These results are illustrated together in FIG. 5.

Here, it will be considered as a comparative example to use a flexible frequency grid without dividing an optical frequency band by separators. In this case, there can be various usage situations of the optical frequency band in the optical fiber transmission line from the node A to the node C in the optical network 300 illustrated in FIG. 1. An example of the usage situations is illustrated in FIG. 6.

Figure 6:
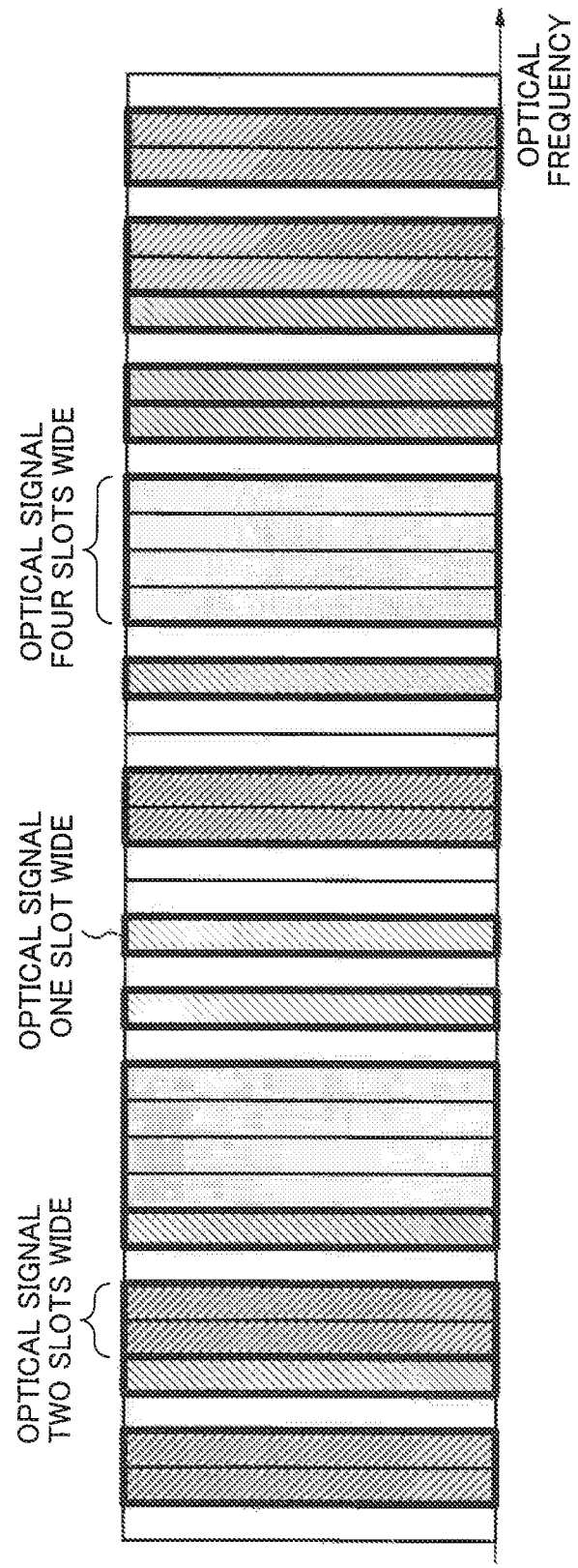
FIG. 6 is a diagram schematically illustrating a usage situation of an optical frequency band in a comparative example with respect to the exemplary embodiments of the present invention.

In the example illustrated in FIG. 6, the number of empty slots is ten for empty slot one slot wide, and two for empty slot two slots wide. In this case, two pieces of empty slot two slots wide can be regarded as four pieces of empty slot one slot wide. Accordingly, if each of all the empty slots is used for an optical path one slot wide, it is possible to accommodate up to fourteen optical paths. If maximum pieces of optical path two slots wide are accommodated, it is possible to accommodate two pieces of optical path two slots wide, and to accommodate ten pieces of optical path one slot wide. These results are illustrated together in FIG. 7.

In the comparative example illustrated in FIG. 6, it is impossible to accommodate an optical path four slots wide. However, according to the optical network controller 100 in the present exemplary embodiment, as illustrated in FIG. 4, it is possible to accommodate one optical path four slots wide. This is based on the effect that the optical network controller 100 in the present exemplary embodiment prevents the fragmentation of the optical frequency band from occurring in the optical fiber transmission line from the node A to the node C in the optical network 300 illustrated in FIG. 1.

As described above, the optical network controller 100 in the present exemplary embodiment makes it possible to accommodate an optical path four slots wide (a large granularity optical path), which has been impractical by the method of the comparative example. In the present exemplary embodiment, it is unnecessary to use the defragmentation technique as described in Patent Literature 1.

A Second Exemplary Embodiment

Next, a second exemplary embodiment of the present invention will be described. An optical network controller according to the present exemplary embodiment includes an optical frequency region setting means 110 and an optical path setting means 120. The optical frequency region setting means 110 divides an optical frequency band used in an optical network 300 and sets a plurality of optical frequency regions. The optical path setting means 120 sets optical paths having a common attribute in at least one of the plurality of optical frequency regions.

The optical network controller according to the present exemplary embodiment differs in the configuration of the optical path setting means 120 from the optical network controller 100 according to the first exemplary embodiment. The optical path setting means 120 in the present exemplary embodiment is configured to derive the number of frequency slots from the sum of bandwidths of an electrical signal to generate an optical signal to be accommodated in an optical path. That is to say, although the optical path setting means 120 according to the first exemplary embodiment sets an optical path only by the multiplexing in an optical domain, the optical path setting means 120 in the present exemplary embodiment sets an optical path by using the multiplexing in an electrical domain together.

For example, the optical path setting means 120 according to the first exemplary embodiment is configured to generate an optical path four slots wide from an electrical signal having a bandwidth four slots wide. In contrast, the optical path setting means 120 in the present exemplary embodiment is configured to generate an optical path four slots wide by performing an electric-optic conversion on an electrical signal four slots wide that is generated by electrically multiplexing a plurality of electrical signals, each of which has a bandwidth with a smaller slot width than four slots width.

Figure 8A:
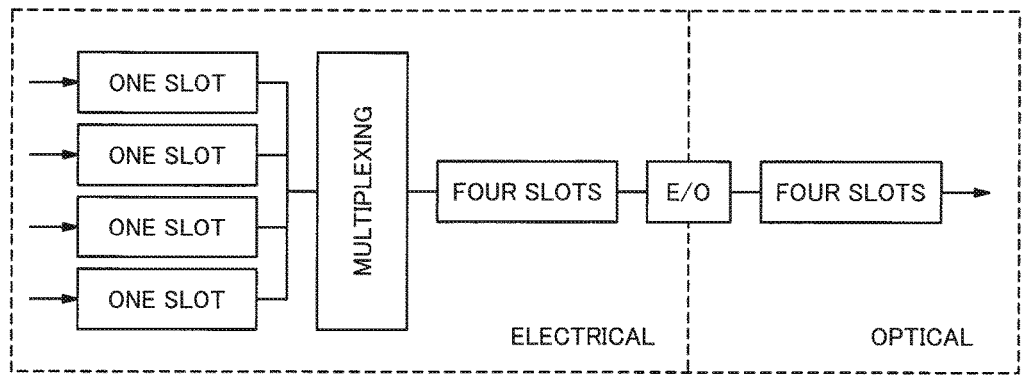
FIG. 8A is a schematic diagram for describing an operation of an optical path setting means included in an optical network controller in accordance with a second exemplary embodiment of the present invention.
Figure 8B:
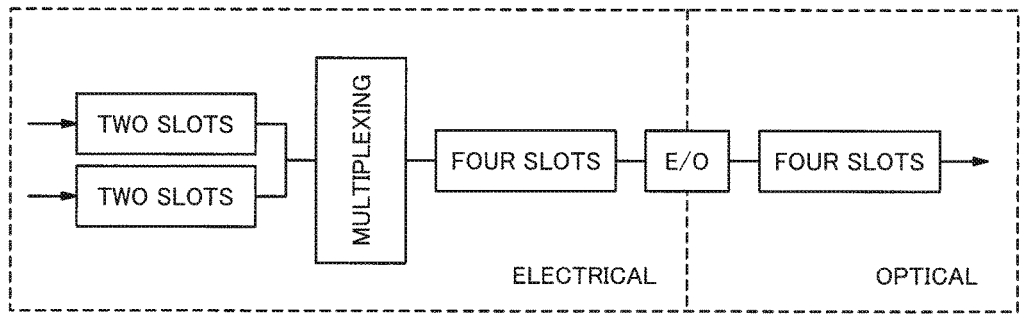
FIG. 8B is a schematic diagram for describing another operation of the optical path setting means included in the optical network controller in accordance with the second exemplary embodiment of the present invention.
Figure 8C:
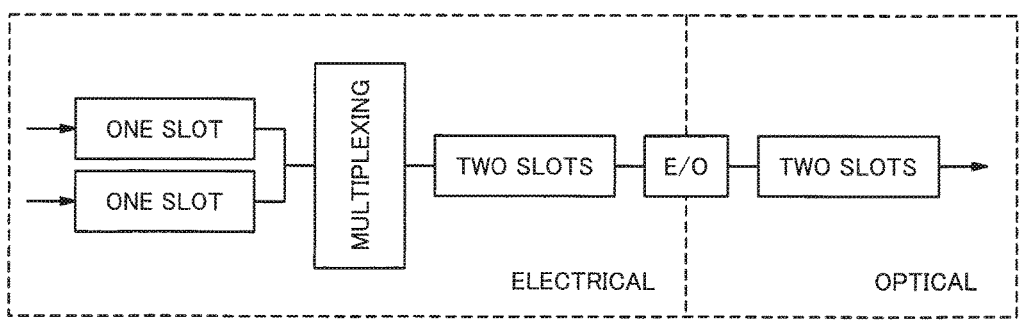
FIG. 8C is a schematic diagram for describing yet another operation of the optical path setting means included in the optical network controller in accordance with the second exemplary embodiment of the present invention.

As illustrated in FIG. 8A, a specific example can be configured to generate an optical path four slots wide by performing an electric-optic conversion on an electrical signal four slots wide that is generated by electrically multiplexing four electrical signals, each of which has a bandwidth one slot wide. Alternatively, as illustrated in FIG. 8B, another specific example can be configured to generate an optical path four slots wide by performing an electric-optic conversion on an electrical signal four slots wide that is generated by electrically multiplexing two electrical signals, each of which has a bandwidth two slots wide. Alternatively, as illustrated in FIG. 8C, yet another specific example can be configured to generate an optical path two slots wide by performing an electric-optic conversion on an electrical signal two slots wide that is generated by electrically multiplexing two electrical signals, each of which has a bandwidth one slot wide.

In generating an optical signal four slots wide, it could be that there is only one electrical signal one slot wide and that three pieces of electrical signal one slot wide are deficient. In this case, an optical signal four slots wide may be generated by adding three dummy signals or replicating the electrical signal one slot wide. That is to say, for example, as illustrated in FIG. 9, an optical signal (an optical path) four slots wide may be generated by performing an electric-optic conversion on an electrical signal four slots wide that is generated by electrically multiplexing one electrical signal one slot wide and three pieces of dummy electrical signal one slot wide.

However, the above-mentioned electrical multiplexing can be applied only if all the electrical signals to be multiplexed are transmitted from the identical node and are received by the identical node. It is excluded to separate only a part of signals at an intermediary node or interchange data, for example.

As mentioned above, the optical path setting means 120 in the present exemplary embodiment is configured to use the multiplexing in an electrical domain together. This makes it possible to accommodate a signal one slot wide also in the band 2 and band 3 by multiplexing, whereas the signal one slot wide can be accommodated only in the band 1 by multiplexing signals only in the optical domain.

A specific example will be described based on the example illustrated in the first exemplary embodiment (see FIG. 4). In the example illustrated in FIG. 4, the number of empty slots is four in the band 1, four in the band 2, and six in the band 3. In this case, the maximum number of addable optical paths is four in the band 1 for optical path one slot wide, two in the band 2 for optical path two slots wide, and one in the band 3 for optical path four slots wide. Using the electrical multiplexing makes it possible to accommodate an electrical signal one slot wide in each of all the addable optical paths. Accordingly, the maximum number of addable optical path one slot wide is twelve in total, that is, four in the band 1 (one slot×four), four in the band 2 (two slots× two), and four in the band 3 (four slots×one). Similarly, the maximum number of addable optical path two slots wide is four in total, that is, zero in the band 1 because only an optical path one slot wide can be accommodated in the band 1, two in the band 2 (two slots×two), and two in the band 3 (two slots×two). These results are illustrated together in FIG. 10.

If the above results are compared with the results obtained by the optical path setting means 120 in the first exemplary embodiment illustrated in FIG. 5, it is clear that the maximum number of addable allocation increases in the band 1 and the band 2. This is based on the effect due to the configuration in which the electrical multiplexing is used together. As described above, using the electrical multiplexing together makes it possible to improve further the usage efficiency of the optical frequency band in the optical fiber transmission line from the node A to the node C in the optical network 300 illustrated in FIG. 1.

Figures 11A, 11B:
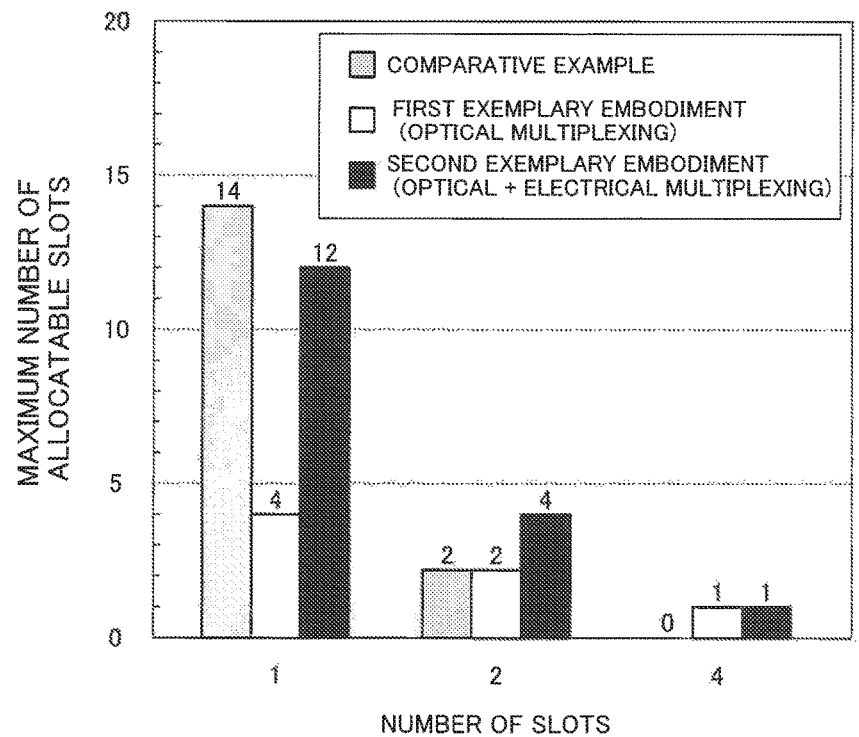
FIG. 11A is a table illustrating the numbers of optical paths that can be set in optical frequency regions by the optical network controllers in accordance with the first exemplary embodiment and the second exemplary embodiment of the present invention together with the case of the comparative example.
FIG. 11B is a diagram illustrating the numbers of optical paths that can be set in optical frequency regions by the optical network controllers in accordance with the first exemplary embodiment and the second exemplary embodiment of the present invention together with the case of the comparative example.

If the results obtained by the optical path setting means 120 in the present exemplary embodiment illustrated in FIG. 10 are compared with the results of the comparative example illustrated in FIG. 7, it is clear that the maximum number of addable allocation increases in the band 2 and the band 3. The above results are illustrated together in FIG. 11A and FIG. 11B.

A Third Exemplary Embodiment

Next, a third exemplary embodiment of the present invention will be described. An optical network controller according to the present exemplary embodiment includes an optical frequency region setting means 110 and an optical path setting means 120. The optical frequency region setting means 110 divides an optical frequency band used in an optical network 300 and sets a plurality of optical frequency regions. The optical path setting means 120 sets optical paths having a common attribute in at least one of the plurality of optical frequency regions.

The optical network controller according to the present exemplary embodiment differs in the configuration of the optical path setting means 120 from the optical network controller 100 according to the first exemplary embodiment. The optical path setting means 120 in the present exemplary embodiment is configured to use a connection period of an optical path as an attribute, and to set optical paths having a common connection period in at least one of the optical frequency regions. Specifically, a contract period during which an optical path stays connected is used as the attribute of an optical path instead of the number of slots used in the first and second exemplary embodiments.

In general, the shorter a period during which an optical path stays connected is, the higher the frequency of adding or deleting an optical path is. Accordingly, the fragmentation of the optical frequency band is made likely. The optical network controller in the present exemplary embodiment, however, makes it possible to prevent the occurrence of the fragmentation as will become apparent below.

Figure 12:
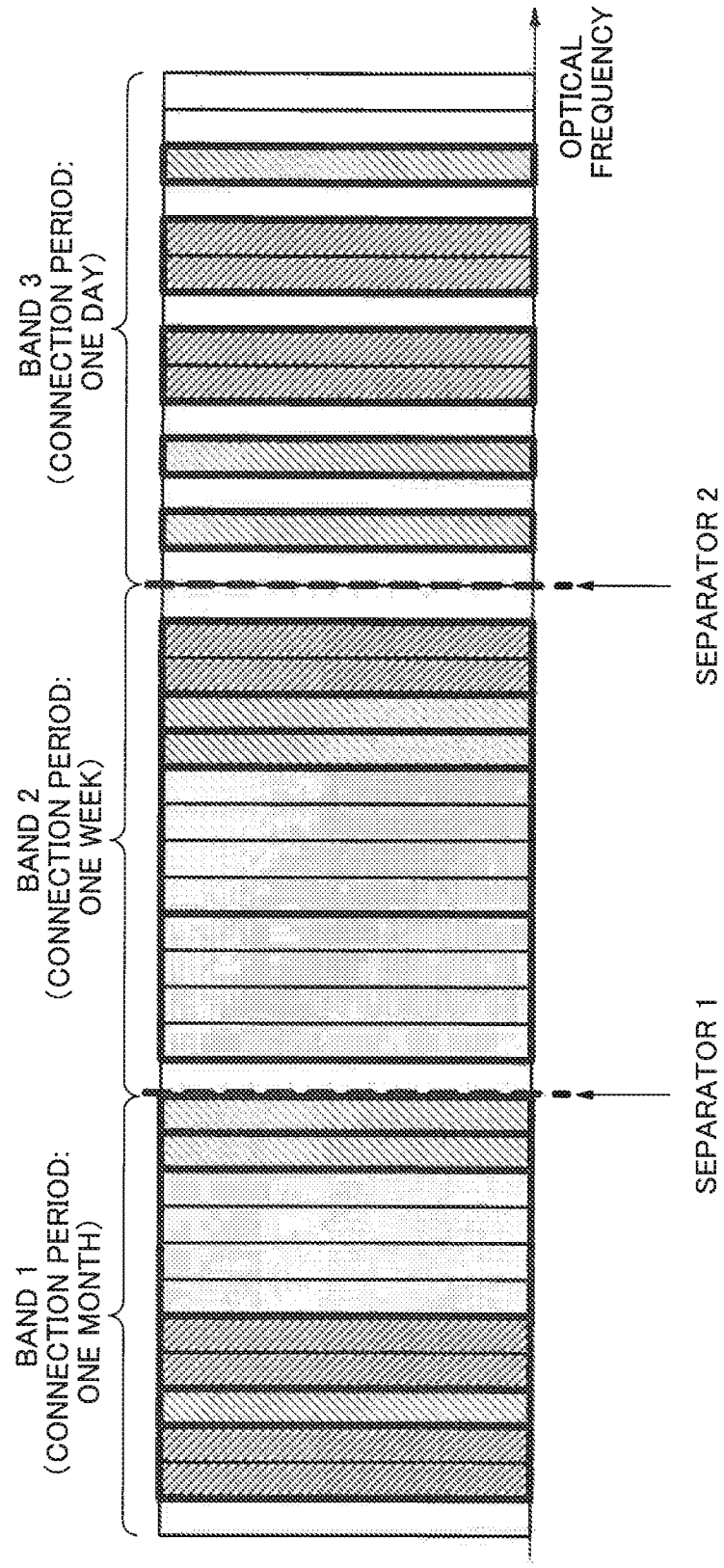
FIG. 12 is a diagram schematically illustrating optical paths set in optical frequency regions by an optical network controller in accordance with a third exemplary embodiment of the present invention.

In the present exemplary embodiment, as illustrated in FIG. 12, an optical path with a connection period of one month is accommodated in the band 1, an optical path with a connection period of one week is accommodated in the band 2, and an optical path with a connection period of one day is accommodated in the band 3, for example. In the band 1 with the contract period equal to one month, three pieces of optical path one slot wide, two pieces of optical paths two slots wide, and one optical path four slots wide are accommodated. In the band 2 with the contract period equal to one week, two pieces of optical path one slot wide, one optical path two slots wide, and two pieces of optical path four slots wide are accommodated. In the band 3 with the contract period equal to one day, three pieces of optical path one slot wide, and two pieces of optical path two slots wide are accommodated.

Figure 13:
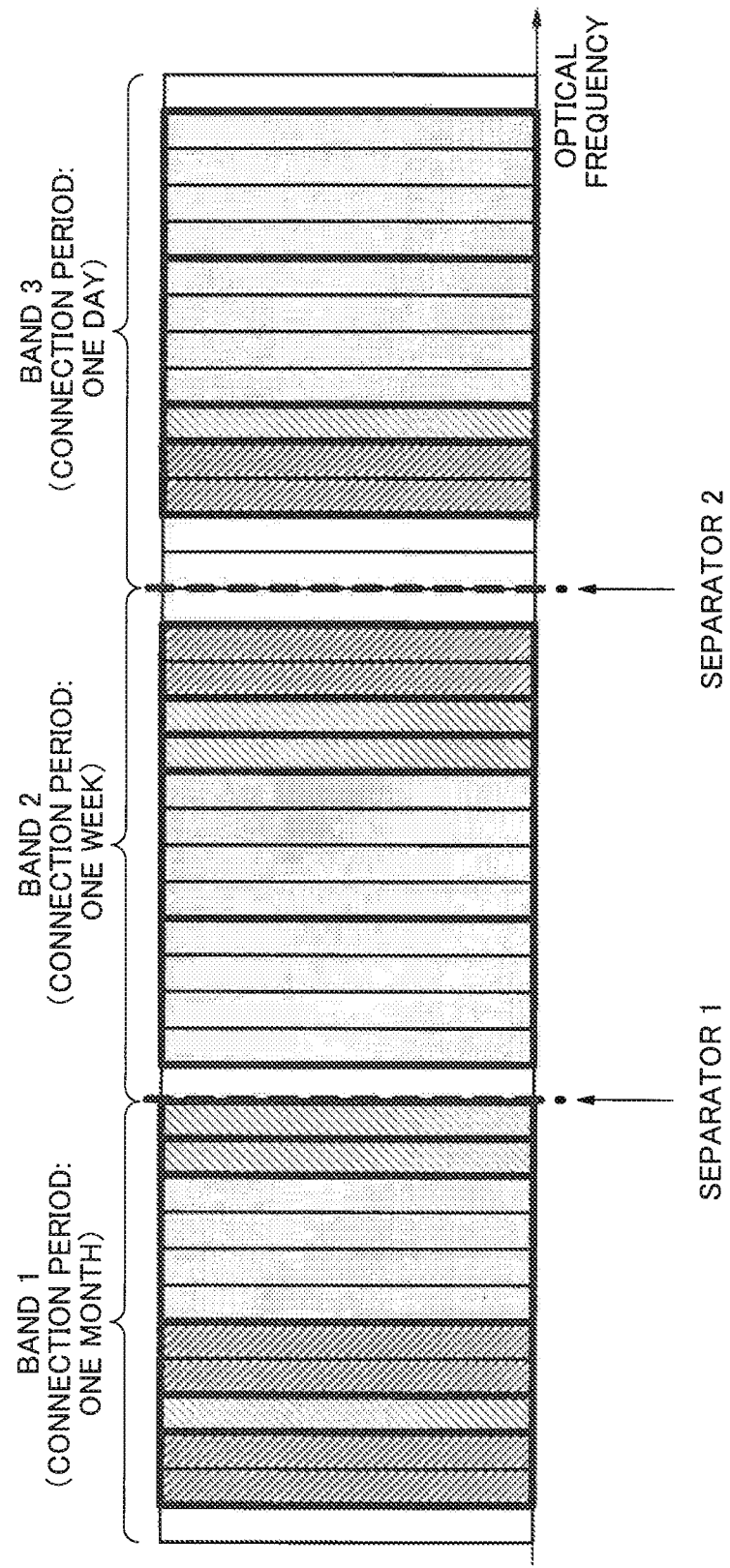
FIG. 13 is a diagram schematically illustrating a usage situation of an optical frequency band in the optical network controller in accordance with the third exemplary embodiment of the present invention.
Figure 14:
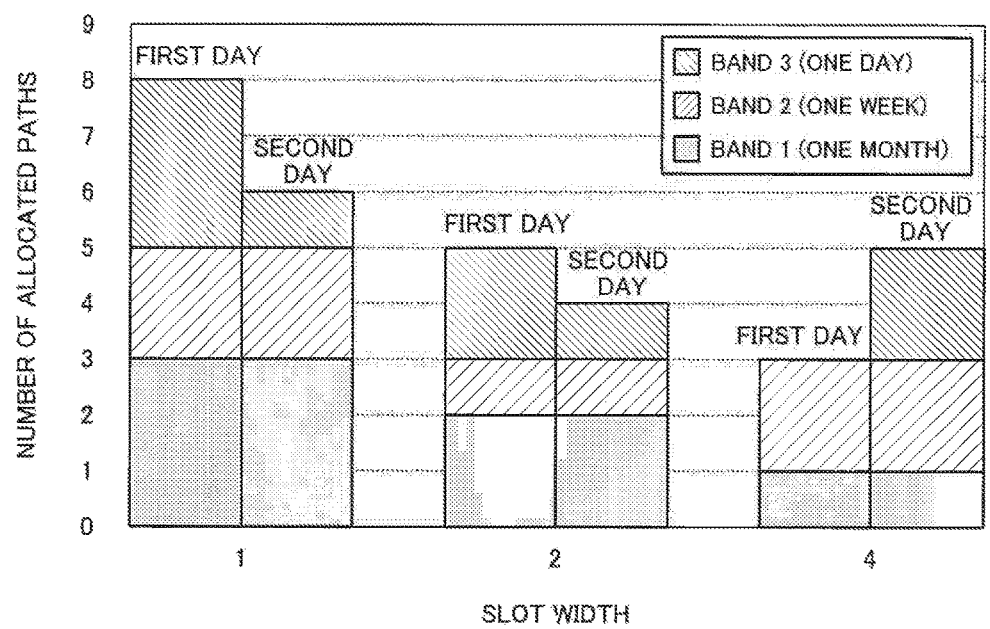
FIG. 14 is a diagram illustrating together the numbers of optical paths set in optical frequency regions by the optical network controller in accordance with the third exemplary embodiment of the present invention.

FIG. 13 illustrates an example of the situation on a day when one day has passed since the day that the situation of the optical frequency region is illustrated in FIG. 12, and in the situation, optical paths have been reconfigured in the band 3 with the contract period equal to one day. Specifically, the situation of the optical paths accommodated in the band 3 changes from the situation where three pieces of optical path one slot wide and two pieces of optical path two slots wide are accommodated to the situation where one optical path one slot wide, one optical path two slots wide, and two pieces of optical path four slots wide are accommodated. FIG. 14 illustrates together changes in the number of the optical paths allocated to the bands 1 to 3 from the first day to the second day.

Figure 15:
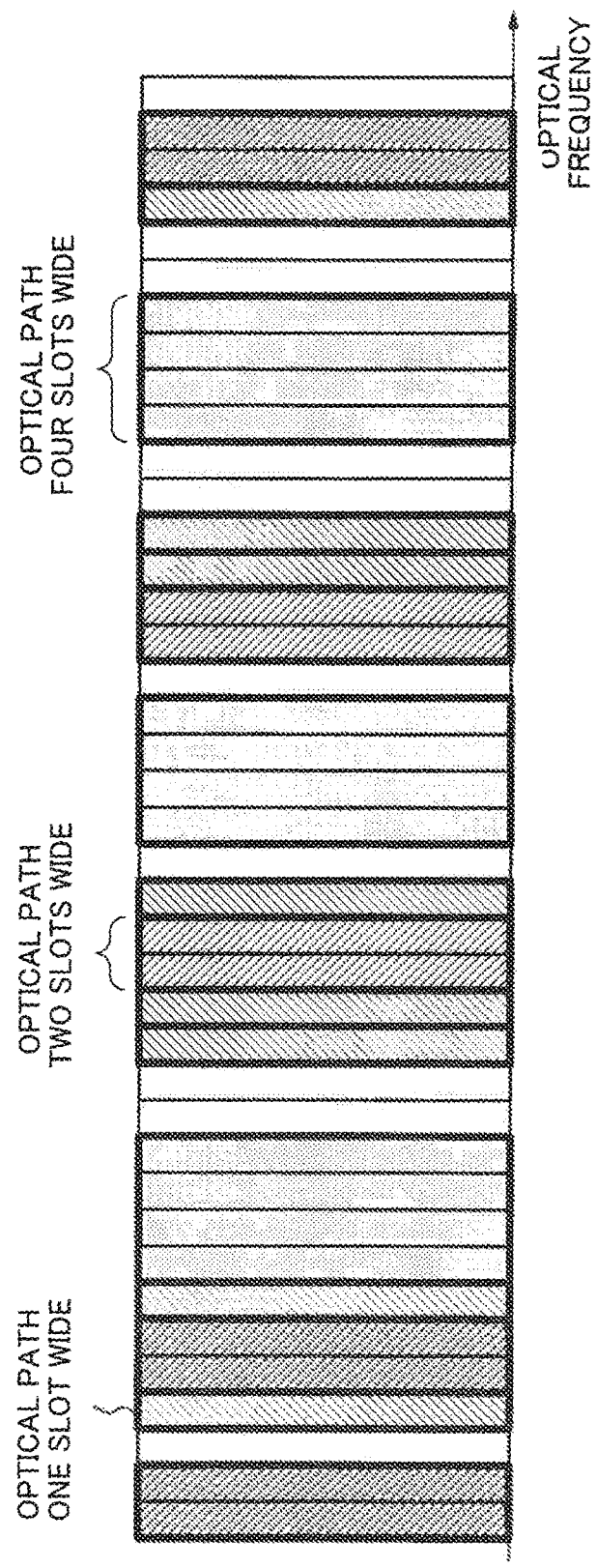
FIG. 15 is a diagram schematically illustrating a usage situation an optical frequency band in a comparative example with respect to the third exemplary embodiment of the present invention.

Here, it will be considered as a comparative example to use a flexible frequency grid without dividing an optical frequency band by separators. A usage situation of the optical frequency band in the initial state (on the first day) in this case is assumed to be the situation illustrated in FIG. 15, for example. In this case, each number of optical paths having one slot, two slots, and four slots in width is the same as that in the present exemplary embodiment illustrated in FIG. 12.

Figure 16:
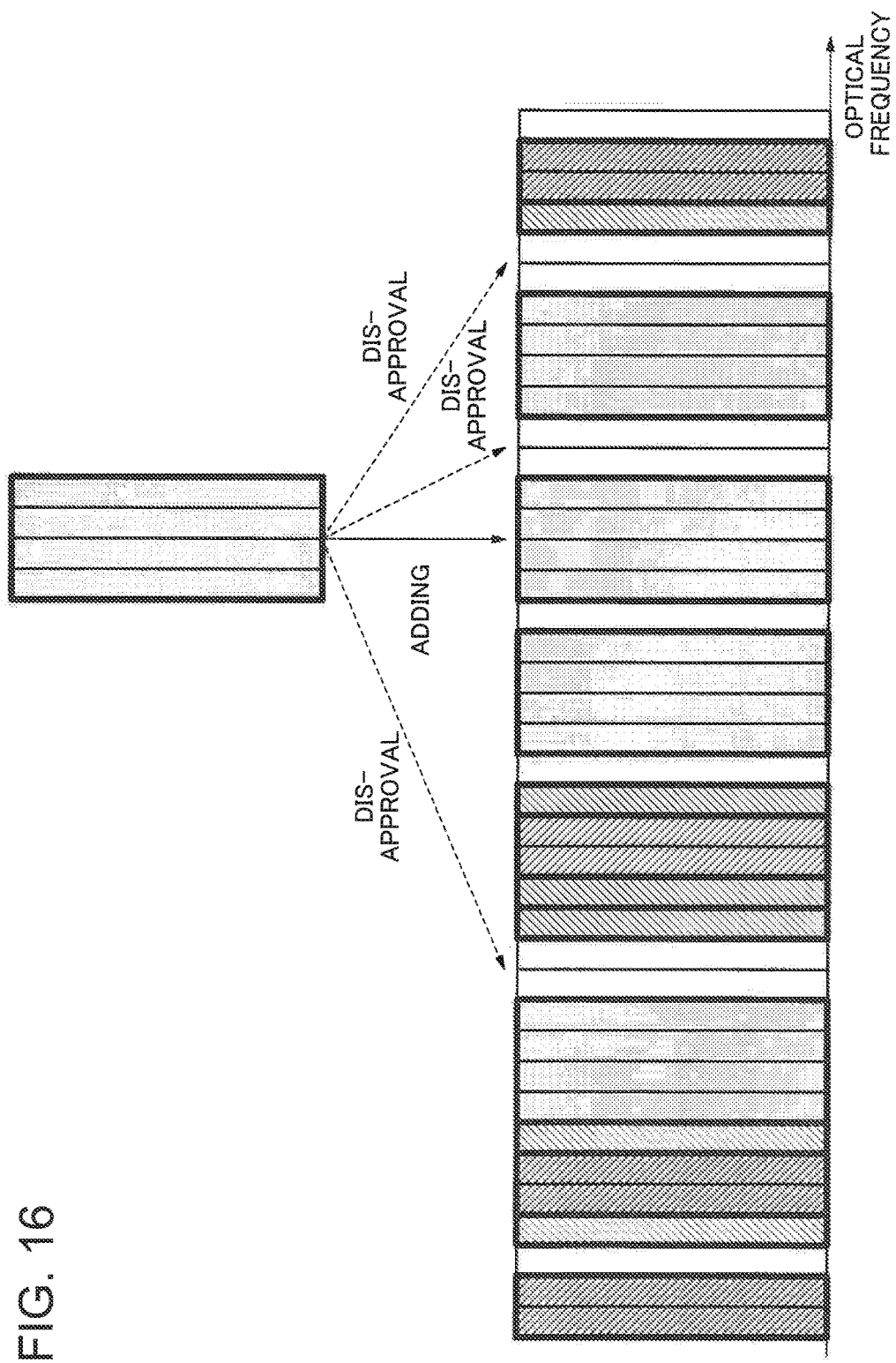
FIG. 16 is a schematic diagram for describing optical path setting in the comparative example with respect to the third exemplary embodiment of the present invention.
Figure 17:
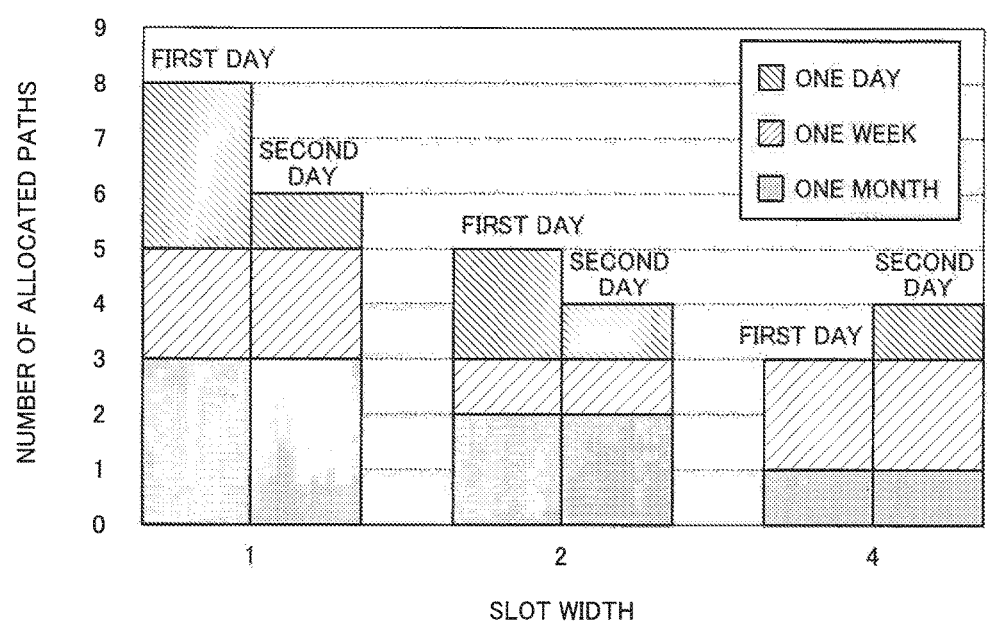
FIG. 17 is a diagram illustrating together the numbers of optical paths that can be set in the comparative example with respect to the third exemplary embodiment of the present invention.

Next, the situation on the second day is considered when a period of one day contract has passed among the contract periods for the optical path connection. The types of optical paths to be added or deleted are the same as those in the present exemplary embodiment illustrated in FIG. 13. In the case of the comparative example, however, if trying to delete one optical path two slots wide and two pieces of optical path one slot wide, and add one optical path four slots wide, the number of addable optical path four slots wide is limited to one, as illustrated in FIG. 16. FIG. 17 illustrates together increases or decreases in optical paths in the comparative example.

As is clear from comparison of FIG. 17 with FIG. 14, the number of addable optical path four slots wide decreases on the second day in the comparative example. This shows that it is possible to prevent the occurrence of fragmentation according to the present exemplary embodiment. As a result, according to the optical network controller in the exemplary embodiment, it is possible to improve the usage efficiency of the optical frequency.

The above-mentioned exemplary embodiments are described in which the number of frequency slots composing an optical path, or a connection period of an optical path is used as the attribute of the optical path. The present invention, however, is not limited to this. It is possible to use the number of domains in the optical network through which optical paths pass, for example. Specifically, for example, it can be considered that the entire optical network is a group including a domain "a" of a subnetwork controlled by the operator A, a domain "b" of a subnetwork controlled by the operator B, and the like. In this case, an optical path only within the domain "a", an optical path only within the domain "b", and an optical path lying astride both in the domain "a" and the domain "b" may be set in optical frequency regions different from each other, respectively. A use for an optical path, a person in charge of operating an optical path, or the like may be used as the attribute of an optical path.

The present invention has been described by taking the exemplary embodiments described above as model examples. However, the present invention is not limited to the aforementioned exemplary embodiments. The present invention can be implemented in various modes that are apparent to those skilled in the art within the scope of the present invention.

This application is based upon and claims the benefit of priority from Japanese Patent Application No. 2014-089695, filed on Apr. 24, 2014, the disclosure of which is incorporated herein in its entirety by reference.

REFERENCE SIGNS LIST

100 Optical network controller
110 Optical frequency region setting means
120 Optical path setting means
200 Optical node device
210 Optical transmitting and receiving means
220 Control means
300 Optical network
1000 Optical network system

What is claimed is:

1. An optical network controller, comprising:
a memory and a processor configured to execute instructions stored in the memory and thereby implement:
an optical frequency region setting circuit configured to divide an optical frequency band used in an optical network based on a dense wavelength division multiplexing system using a flexible frequency grid, and set a plurality of optical frequency regions; and
an optical path setting circuit configured to set optical paths having a common attribute in at least one of the plurality of optical frequency regions,
wherein the optical path setting circuit additionally sets another optical path having the common attribute in the one of the plurality of optical frequency regions, in order to prevent fragmentation of an optical frequency band from occurring.

2. The optical network controller according to claim 1, wherein the optical path setting circuit sets each of the optical paths having an attribute different from one another in each of the plurality of optical frequency regions.

3. The optical network controller according to claim 1, wherein the optical path setting circuit sets the optical paths using number of frequency slots composing each of the optical paths as the attribute.

4. The optical network controller according to claim 3, wherein the optical path setting circuit derives the number of frequency slots from a sum of bandwidths of an electrical signal to generate an optical signal to be accommodated in each of the optical paths.

5. The optical network controller according to claim 1, wherein the optical path setting circuit sets the optical paths using a connection period of the optical paths as the attribute.

6. An optical network system, comprising:
the optical network controller according to claim 1; and
an optical node device configured to be used for an optical network based on a dense wavelength division multiplexing system using a flexible frequency grid
wherein
the optical node device comprises:
an optical transmitter and receiver configured to transmit and receive an optical signal propagating through the optical network, and
a memory and a processor configured to execute instructions stored in the memory and thereby implement a control circuit configured to set a center frequency and a bandwidth of the optical signal in the optical transmitting and receiving circuit so as to accommodate the optical signal in a specific optical path,
wherein the control circuit selects the specific optical path from among optical paths having a common attribute that are set in at least one of the plurality of optical frequency regions obtained by dividing the optical frequency band used in the optical network, and additionally selects another specific optical path differing from the specific optical path from among optical paths having the common attribute, in order to prevent fragmentation of an optical frequency band from occurring.

7. The optical network controller according to claim 2, wherein the optical path setting circuit sets the optical paths using number of frequency slots composing each of the optical paths as the attribute.

8. The optical network controller according to claim 2, wherein the optical path setting circuit sets the optical paths using a connection period of the optical paths as the attribute.

9. An optical node device, comprising:
an optical transmitter and receiver configured to transmit and receive an optical signal propagating through an optical network based on a dense wavelength division multiplexing system using a flexible frequency grid;
a memory and a processor configured to execute instructions stored in the memory and thereby implement:
a control circuit configured to set a center frequency and a bandwidth of the optical signal in the optical transmitting and receiving circuit so as to accommodate the optical signal in a specific optical path, wherein the control circuit selects the specific optical path from among optical paths having a common attribute that are set in at least one of a plurality of optical frequency regions obtained by dividing an optical frequency band used in the optical network, and additionally selects another specific optical path differing from the specific optical path from among optical paths having the common attribute, in order to prevent fragmentation of an optical frequency band from occurring.

10. The optical node device according to claim 9, wherein the optical paths have in common number of frequency slots composing each of the optical paths.

11. The optical node device according to claim 9, wherein the optical paths have a connection period of each of the optical paths in common.

12. An optical network control method, comprising:
dividing an optical frequency band used in an optical network based on a dense wavelength division multiplexing system using a flexible frequency grid, and setting a plurality of optical frequency regions; and
setting optical paths having a common attribute in at least one of the plurality of optical frequency regions, and additionally setting another optical path having the common attribute in the one of the plurality of optical frequency regions, in order to prevent fragmentation of an optical frequency band from occurring.

13. The optical network control method according to claim 12,
wherein the setting of the optical paths includes setting each of the optical paths having an attribute different from one another in each of the plurality of optical frequency regions.

14. The optical network control method according to claim 12,
wherein the setting of the optical paths includes setting the optical paths using number of frequency slots composing each of the optical paths as the attribute.

15. The optical network control method according to claim 12,
wherein the setting of the optical paths includes setting the optical paths using a connection period of the optical paths as the attribute.

16. The optical network control method according to claim 13,
wherein the setting of the optical paths includes setting the optical paths using number of frequency slots composing each of the optical paths as the attribute.

17. The optical network control method according to claim 13,
wherein the setting of the optical paths includes setting the optical paths using a connection period of the optical paths as the attribute.

18. The optical network control method according to claim 14,
wherein the setting of the optical paths includes deriving the number of frequency slots from a sum of bandwidths of an electrical signal to generate an optical signal to be accommodated in each of the optical paths.

* * * * *